US011501385B2

(12) United States Patent
Akagane et al.

(10) Patent No.: US 11,501,385 B2
(45) Date of Patent: Nov. 15, 2022

(54) ASSET INFORMATION COLLECTION APPARATUS

(71) Applicant: Nomura Research Institute, Ltd., Tokyo (JP)

(72) Inventors: Yuichiro Akagane, Tokyo (JP); Tomoki Yabu, Tokyo (JP); Shinnosuke Yokota, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 16/185,873

(22) Filed: Nov. 9, 2018

(65) Prior Publication Data
US 2019/0147546 A1 May 16, 2019

(30) Foreign Application Priority Data

Nov. 10, 2017 (JP) .............................. JP2017-216925

(51) Int. Cl.
*G06Q 40/00* (2012.01)
*H04L 9/40* (2022.01)
(Continued)

(52) U.S. Cl.
CPC ......... *G06Q 40/12* (2013.12); *G06F 21/6254* (2013.01); *H04L 63/0407* (2013.01); *H04L 67/1097* (2013.01); *H04L 67/53* (2022.05)

(58) Field of Classification Search
CPC ........ G06Q 40/06; G06Q 50/10; G06Q 40/12; G06F 21/6254; H04L 63/0407; H04L 67/1097; H04L 67/20
See application file for complete search history.

(56) References Cited

U.S. PATENT DOCUMENTS 8,533,092 B1* 9/2013 Burrow ................. G06Q 40/02
705/36 R
9,619,669 B2* 4/2017 LaFever ............. G06F 21/6254
(Continued)

FOREIGN PATENT DOCUMENTS

| JP | 2004-133879 A | 4/2004 |
| JP | 2014-192707 A | 10/2014 |
| JP | 2017-156976 | 9/2017 |

OTHER PUBLICATIONS

R. S. George and S. Sabitha, "Data anonymization and integrity checking in cloud computing," 2013 Fourth International Conference on Computing, Communications and Networking Technologies (ICCCNT), 2013, pp. 1-5, doi: 10.1109/ICCCNT.2013.6726813. (Year: 2013).*

Primary Examiner — David P Sharvin
Assistant Examiner — Steven R Chism
(74) Attorney, Agent, or Firm — Staas & Halsey LLP (57) ABSTRACT

An asset information collection apparatus includes: a first reception part configured to cause a plurality of first servers to anonymize a plurality of items of asset information and to generate a plurality of items of anonymous asset information such that a specific individual cannot be identified based on the items of asset information when the items of asset information stored in the first servers are viewed by one or more user terminals, and configured to receive the items of anonymous asset information from the first servers; a second reception part configured to be for one or more users using the one or more user terminals and to receive one or more identifiers that is not capable of identifying a specific individual from the first servers; and a storage part configured to store the items of anonymous asset information in association with the one or more identifiers.

8 Claims, 7 Drawing Sheets

(51) Int. Cl.
*G06F 21/62* (2013.01)
*H04L 67/53* (2022.01)
*H04L 67/1097* (2022.01)

(56) References Cited

U.S. PATENT DOCUMENTS

| | | | |
|---|---|---|---|
| 9,940,396 B1* | 4/2018 | Willhoit | G06F 3/167 |
| 10,089,690 B1* | 10/2018 | Radha | G06Q 40/06 |
| 2004/0236658 A1* | 11/2004 | Bowman | G06Q 40/06 |
| | | | 705/36 R |
| 2013/0197998 A1* | 8/2013 | Buhrmann | G06Q 30/0255 |
| | | | 705/14.53 |
| 2013/0232075 A1* | 9/2013 | Monaghan | G06Q 20/403 |
| | | | 705/44 |
| 2014/0298030 A1 | 10/2014 | Akiyama et al. | |
| 2015/0012631 A1* | 1/2015 | Udani | H04W 4/029 |
| | | | 709/223 |
| 2016/0005029 A1* | 1/2016 | Ivey | G09C 1/00 |
| | | | 705/44 |
| 2016/0283745 A1* | 9/2016 | LaFever | G06F 21/6254 |
| 2016/0323247 A1* | 11/2016 | Stein | H04L 63/0421 |
| 2017/0041296 A1* | 2/2017 | Ford | H04W 12/02 |
| 2017/0091865 A1* | 3/2017 | Hayden | G06Q 40/08 |
| 2017/0237739 A1* | 8/2017 | Nandakumar | G06F 21/36 |
| | | | 705/44 |
| 2018/0101917 A1* | 4/2018 | Fujita | G06F 21/6245 |

\* cited by examiner

| IDENTIFIER (D2) | TYPE OF BUSINESS (D1a) | FINANCE INSTITUTION NAME (D1b) | INDIVIDUAL SCORE (D1c) | TOTAL SCORE (D1d) | RELIABILITY (D1e) |
|---|---|---|---|---|---|
| abcd | BANK | BANK B | 10 | 5 | A |
|  | SECURITIES | SECURITIES FIRM A | 5 |  |  |
| wxyz | SECURITIES | SECURITIES FIRM C | 1 | 7 | C |
|  | SECURITIES | SECURITIES FIRM C | 6 |  |  |

(D1 encompasses columns D1a–D1e)

ASSET INFORMATION COLLECTION APPARATUS

CROSS-REFERENCE TO RELATED APPLICATIONS

This application is based on and claims priority under 35 U.S.C. § 119 to Japanese Patent Application No. 2017-216925, filed Nov. 10, 2017, the entire content of which is incorporated herein by reference.

BACKGROUND

Technical Field

The present invention relates to an asset information collection apparatus.

Related Art

Conventionally, information on personal assets is rigidly managed by finance institutions holding the asset information such that the asset information cannot be viewed by a third party without permission of the individuals.

JP 2017-156976 A describes an asset management apparatus which, in order to disclose asset information in a predetermined case, receives an input of client asset information, creates an asset list on the basis of the asset information and the balance of an acquired financial account, and transmits the registered asset list to a terminal apparatus of the client in response to a request of the client or at a predetermined timing.

SUMMARY

In recent years, due to the revision of the personal information protection law, various items of personal information including asset information are anonymized so that the anonymized personal information can be provided to a third party without permission of the individuals. Thereby, a plurality of finance institutions anonymizes asset information of clients thereby to provide the anonymized asset information to a third party.

It is desirable that the asset information on almost all the assets of individuals be acquired. For example, if an individual deposits almost his/her assets and another individual holds almost his/her assets as securities, even if only the information on the deposits can be compared, the asset situations cannot be appropriately compared, which is less usable.

However, a finance institution cannot view the asset information held by another finance institution, and cannot easily acquire even anonymized asset information. It is therefore difficult to make use of asset information although anonymized asset information can be provided to a third party without permission at present.

It is therefore an object of the present invention to provide an asset information collection apparatus for smoothly making use of asset information.

According to an aspect of the present invention, there is provided an asset information collection apparatus including: a first reception part configured to cause a plurality of first servers to anonymize a plurality of items of asset information and to generate a plurality of items of anonymous asset information such that a specific individual cannot be identified based on the items of asset information when the items of asset information stored in the first servers are viewed by one or more user terminals, and configured to receive the items of anonymous asset information from the first servers; a second reception part configured to be for one or more users using the one or more user terminals and to receive one or more identifiers that is not capable of identifying a specific individual from the first servers; and a storage part configured to store the items of anonymous asset information in association with the one or more identifiers.

According to the aspect, a plurality of items of anonymous asset information is received by the first servers storing a plurality of items of asset information and stored in the first servers in association with one or more identifiers so that various items of asset information can be stored while being anonymized and being able to be provided to a third party, thereby smoothly making use of the asset information.

In the aspect, the items of anonymous asset information may include scores calculated per type of assets, respectively.

According to the aspect, it is possible to grasp how much assets of what kind one or more users hold and to compare asset situations per type of assets.

In the aspect, the items of anonymous asset information may include total scores as totals of scores calculated per type of assets, respectively.

According to the aspect, it is possible to grasp how much total assets one or more users hold and to compare total asset situations.

In the aspect, the items of anonymous asset information may include reliabilities as evaluated reliabilities of total scores depending on the number of scores used for calculating the total scores, respectively.

According to the aspect, it is possible to confirm whether anonymous asset information on total assets correctly reflects a total asset situation of a user and to more accurately compare total asset situations.

In the aspect, when one or more user terminals access a second server, the second reception part receives the one or more identifiers transmitted from the one or more user terminals via the second server, and a transmission part configured to transmit the items of anonymous asset information associated with the one or more identifiers to the second server may be further provided.

According to the aspect, when the user terminal accesses the second server, the anonymous asset information can be provided to the second server, and the second server can provide a service depending on user's asset situation.

According to the present invention, it is possible to provide an asset information collection apparatus for smoothly making use of asset information.

DETAILED DESCRIPTION

An embodiment of the present invention will be described with reference to the accompanying drawings. The same or similar components are denoted with the same reference numerals in each figure.

Figure 1:
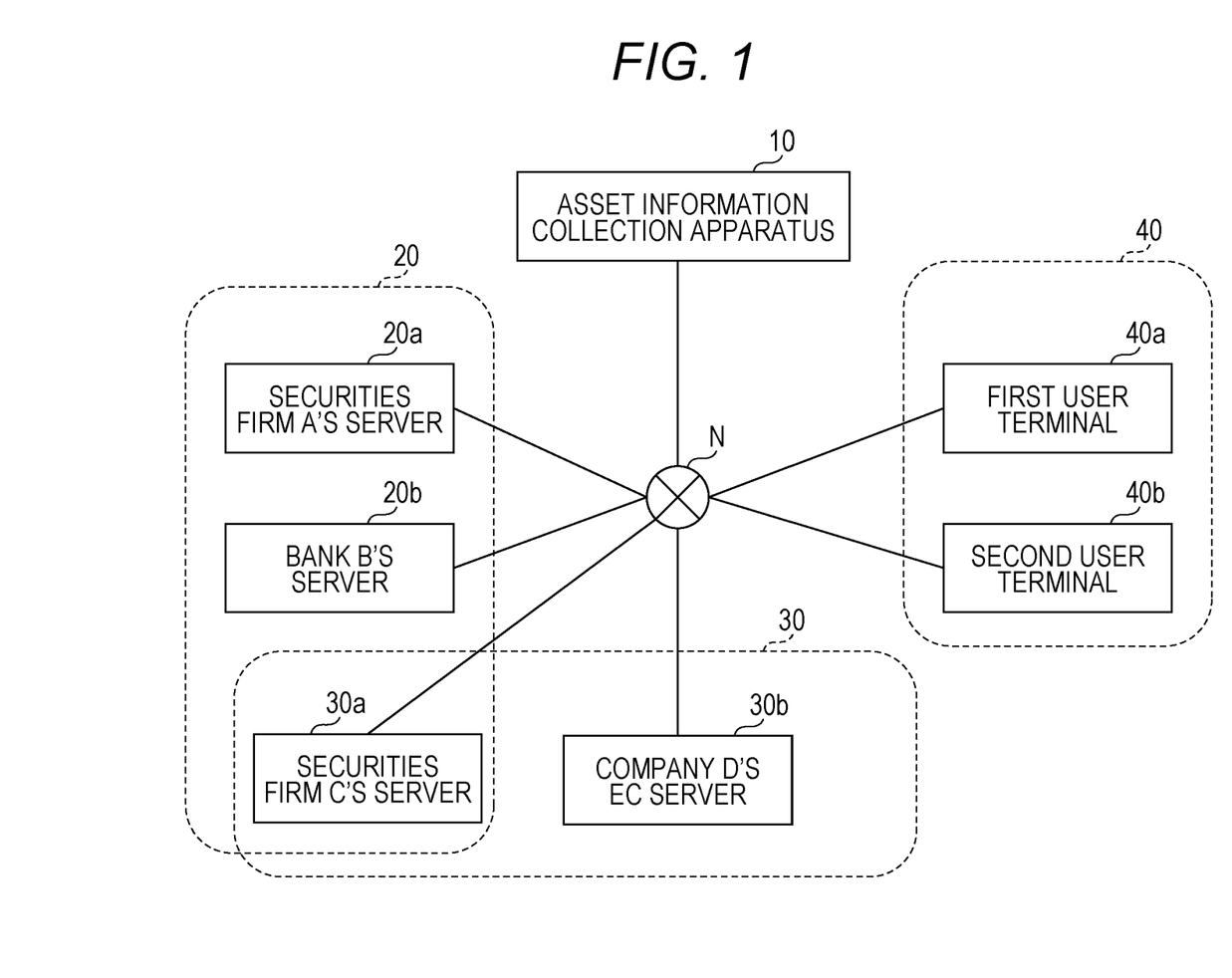
FIG. 1 is a diagram illustrating a network configuration of an asset information collection apparatus according to an embodiment of the present invention.

FIG. 1 is a diagram illustrating a network configuration of an asset information collection apparatus 10 according to the embodiment of the present invention. The asset information collection apparatus 10 is connected to first servers 20 and second servers 30 via a communication network N. The first servers 20 are of finance institutions and the like, and store personal asset information. In the present example, a securities firm A's server 20a and a bank B's server 20b as the first servers 20 are illustrated by way of example. The first servers 20 may include a server which stores information on personal real estate, or a server which stores information on personal insurance, for example. That is, the asset information may include information on insurance, and information on real estate such as land and houses in addition to information on financial assets such as deposits or securities. The asset information may include information on personal debts.

The second servers 30 are directed to providing various services to individuals, and include a securities firm C's server 30a and a company D's electronic commerce (EC) server 30b in the present example. Herein, the securities firm C's server 30a stores personal asset information, and is included also in the first servers 20. The company D's EC server 30b is directed to providing various electronic commerce services.

User terminals 40 include a personally-used personal computer (PC), a smartphone, a tablet terminal, and the like, and include a first user terminal 40a and a second user terminal 40b in the present example.

An individual can view his/her asset information stored in the first servers 20 by use of the user terminal 40. At this time, the asset information collection apparatus 10 collects the anonymized asset information from the first servers 20. Further, an individual can access the second server 30 by use of the user terminal 40 thereby to be provided with various services. At this time, the asset information collection apparatus 10 can transmit the anonymized asset information to the second server 30. Thereby, the second server 30 can display an advertisement or recommend a product according to the asset situation of the user who is accessing.

Figure 2:
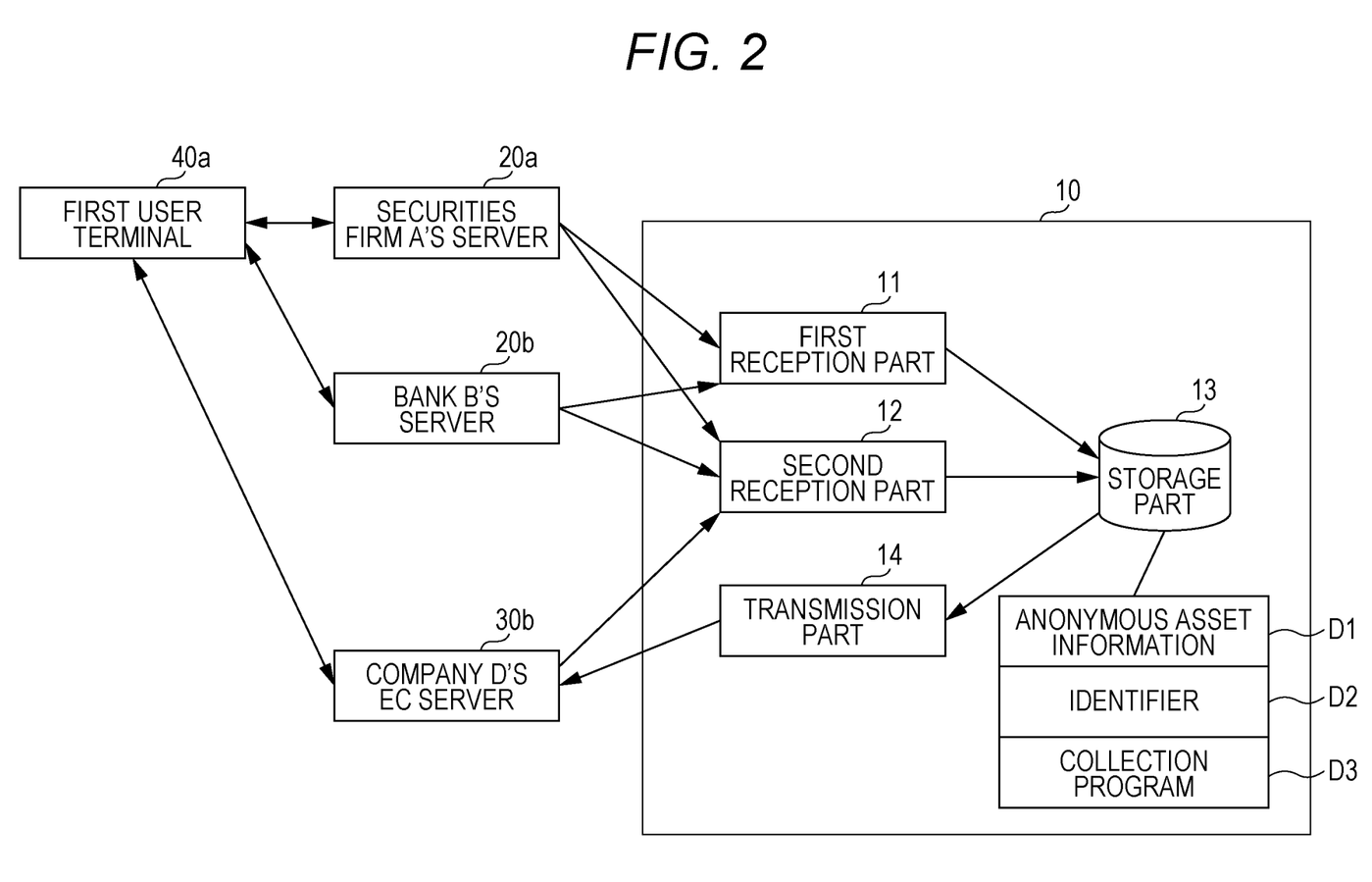
FIG. 2 is a diagram illustrating functional blocks of the asset information collection apparatus according to the embodiment of the present invention.

FIG. 2 is a diagram illustrating functional blocks of the asset information collection apparatus 10 according to the embodiment of the present invention. The asset information collection apparatus 10 comprises a first reception part 11, a second reception part 12, a storage part 13, and a transmission part 14.

The first reception part 11 receives a plurality of items of anonymous asset information from the first servers 20. Herein, a plurality of items of asset information is anonymized by the first servers 20 thereby to generate a plurality of items of anonymous asset information such that a specific individual cannot be identified on the basis of the items of asset information when the items of asset information stored in the first servers 20 are viewed via one or more user terminals 40. In the present example, the first reception part 11 receives anonymous asset information on the number of held securities and their market values from the securities firm A's server 20a, and receives anonymous asset information on deposits from the bank B's server 20b.

A collection program D3 (such as JavaScript (registered trademark)) stored in the storage part 13 is distributed to the first servers 20 so that the asset information may be anonymized by the first servers 20. When a tag for activating the collection program D3 is embedded in a HTML file describing a web page of the first server 20 and the web page of the first server 20 is viewed by the user terminal 40, the collection program D3 may be called and executed. The collection program D3 is executed when the web page is viewed, and the numeric values associated with the asset information are extracted and anonymized such that a specific individual cannot be identified. The collection program D3 may not necessarily be stored in the storage part 13, and may be stored in only the first servers 20 or another apparatus.

Herein, the numeric values associated with the asset information may include the numeric values of deposits, the number of held securities and their market values, insurance premiums or reserved amounts, estimated values of real estates, debts, and the like. The collection program. D3 may extract the numeric values associated with the asset information, and may convert the asset information into 10 degrees of scores depending on the numeric values. The collection program D3 may determine which of the 10 zones a numeric value associated with the asset information belongs to, for example, and may convert the numeric value associated with the asset information into a 10-degree score. Further, the collection program D3 may set a zone used for scoring depending on statistic information such as average total assets or inflation rate such that the scores appropriately change depending on a change in economic situation. A zone used for scoring may be manually set. When the numeric values associated with the asset information are converted into the scores, the collection program D3 may use different algorithms depending on the types of assets. The collection program D3 may calculate a score with positive value or negative value, may convert the numeric values of deposits, the number of held securities or their market values, insurance premiums or reserved amounts, estimated values of real estates, and the like into positive scores, and may convert the numeric values of debts and the like into negative scores.

The second reception part 12 is for one or more users using one or more user terminals 40, and receives one or more identifiers which cannot identify a specific individual from the first servers 20. In the present example, the second reception part 12 receives an identifier corresponding to the user of the first user terminal 40a from the securities firm A's server 20a, and receives the identifier corresponding to the user of the first user terminal 40a also from the bank B's server 20b.

An identifier may be generated by the collection program D3 embedded in the web pages of the first servers 20. The collection program D3 may generate the identifier corresponding to the user of the first user terminal 40a on the basis of the IP address or the like of the first user terminal 40a accessing the first server 20. In this case, the first server 20 transmits the generated identifier to the asset information collection apparatus 10 and the first user terminal 40a. The identifier can be assumed as an HTTP cookie managed by the web browser in the first user terminal 40a, for example.

An identifier may be transmitted from the user terminal 40 to the first servers 20. In this case, the user of the user terminal 40 can previously generate an identifier and use the same identifier for a plurality of terminals. Thereby, when the user changes a terminal to use, the same identifier can be used, which eliminates a problem in which the user is recognized as wrong by the asset information collection apparatus 10 due to the change in terminal.

The storage part 13 stores a plurality of items of anonymous asset information D1 in association with one or more identifiers D2. In the present example, the storage part 13 stores an identifier generated for the first user terminal 40a in association with the anonymous asset information received from the securities firm A's server 20a and the anonymous asset information received from the bank B's server 20b.

In this way, a plurality of items of anonymous asset information is received by the first servers 20 storing a plurality of items of asset information and stored in the first servers 20 in association with one or more identifiers so that various items of asset information can be stored while being anonymized and being able to be provided to a third party, thereby smoothly making use of the asset information.

When one or more user terminals 40 access the second server 30, the second reception part 12 may receive one or more identifiers transmitted from one or more user terminals 40 via the second server 30. In this case, the transmission part 14 transmits a plurality of items of anonymous asset information associated with one or more identifiers to the second server 30. In the present example, when the first user terminal 40a accesses the company D's EC server 30b, an identifier is transmitted from the first user terminal 40a to the company D's EC server 30b, and the identifier is transmitted from the company D's EC server 30b to the asset information collection apparatus 10. The asset information collection apparatus 10 which receives the identifier searches the storage part 13, extracts the anonymous asset information associated with the received identifier, and returns it to the company D's EC server 30b. The company D's EC server 30b can select an advertisement or a product to recommend by use of the received anonymous asset information. An identifier may be transmitted from the web browser of the user terminal 40 to the second servers 30 by use of an HTTP cookie or the like.

When the user terminal 40 accesses the second server 30, the asset information collection apparatus 10 according to the present embodiment can provide anonymous asset information to the second server 30, and the second server 30 can provide a service depending on user's asset situation.

Figure 3:
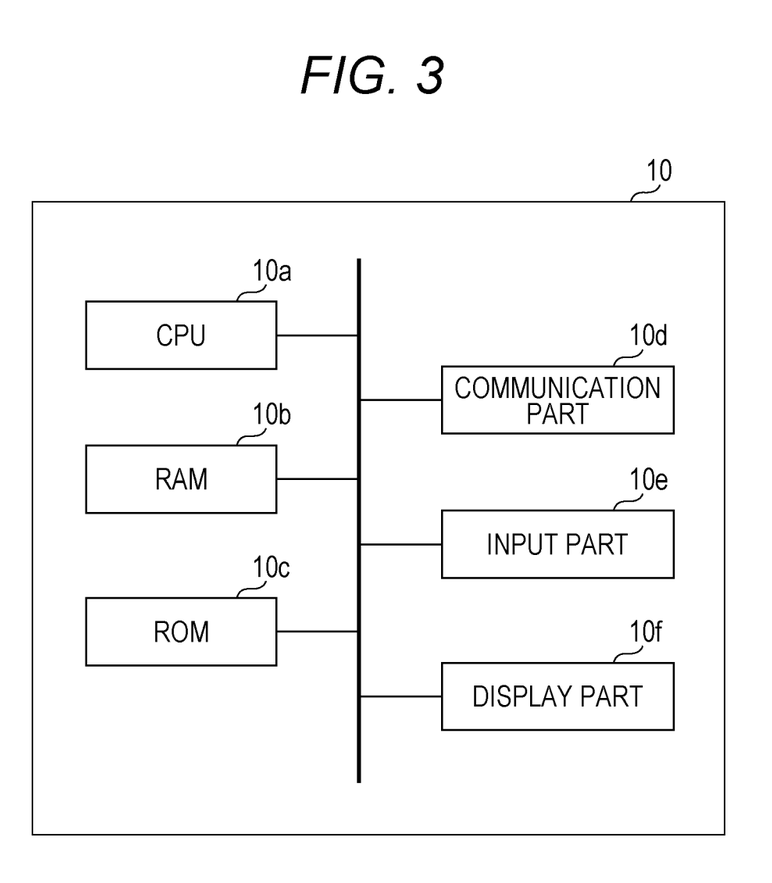
FIG. 3 is a diagram illustrating a physical configuration of the asset information collection apparatus according to the embodiment.

FIG. 3 is a diagram illustrating a physical configuration of the asset information collection apparatus 10 according to the present embodiment. The asset information collection apparatus 10 comprises a central processing unit (CPU) 10a corresponding to a hardware processor, a random access memory (RAM) 10b corresponding to a memory, a read only memory (ROM) 10c corresponding to a memory, a communication part 10d, an input part 10e, and a display part 10f. The respective components are connected to be able to mutually exchange data via a bus. The present example will describe that the asset information collection apparatus 10 is configured of one computer, but the asset information collection apparatus 10 may be realized by a plurality of computers.

The CPU 10a is a control part which controls executing the programs stored in the RAM 10b or the ROM 10c or computes and processes data. The CPU 10a is a computation apparatus which executes a program (asset information collection program) for collecting anonymized asset information. The CPU 10a receives various items of input data from the input part 10e or the communication part 10d, and displays computation results of the input data on the display part 10f or stores them in the RAM 10b or the ROM 10c.

The RAM 10b is a storage part capable of rewriting data, and is configured of a semiconductor storage device, for example. The RAM 10b stores programs or data of applications and the like executed by the CPU 10a.

The ROM 10c is a storage part capable of only reading data, and is configured of a semiconductor storage device, for example. The ROM 10c stores programs or data of firmware and the like, for example.

The communication part 10d is an interface for connecting the asset information collection apparatus 10 to a communication network, and is connected to the communication network N such as local area network (LAN) configured of a data transmission path of wired or wireless line, wide area network (WAN), or the Internet.

The input part 10e receives data input by the user, and includes a keyboard, a mouse, and a touch panel, for example.

The display part 10f is directed to visually displaying the computation results by the CPU 10a, and is configured of a liquid crystal display (LCD), for example.

The asset information collection program may be stored in a computer-readable storage medium such as the RAM 10b or the ROM 10c to be provided, or may be provided via the communication network N connected by the communication part 10d. The CPU 10a in the asset information collection apparatus 10 executes the asset information collection program so that various functions described in FIG. 2 are realized. The physical configuration is exemplary, and may not necessarily be independent. For example, the asset information collection apparatus 10 may comprise large-scale integration (LSI) in which the CPU 10a is integrated with the RAM 10b or the ROM 10c.

Figure 4:
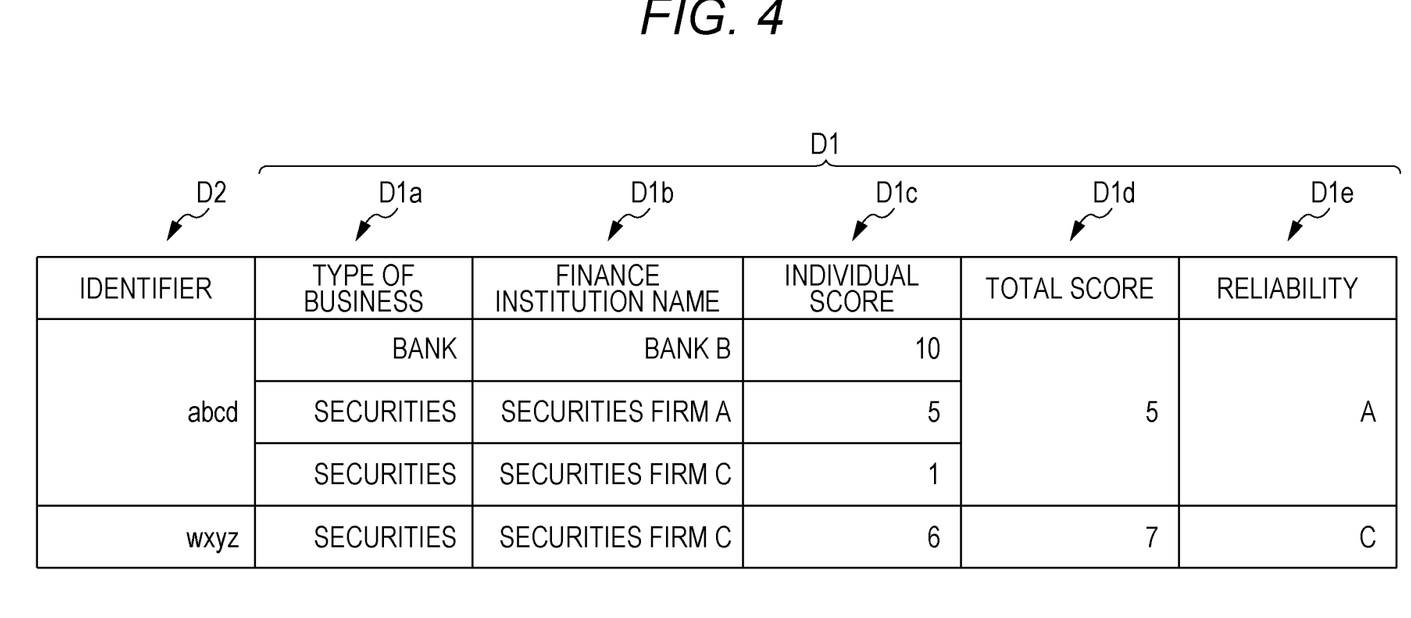
FIG. 4 is a diagram illustrating an outline of anonymous asset information and identifiers collected by the asset information collection apparatus according to the present embodiment.

FIG. 4 is a diagram illustrating an outline of anonymous asset information D1 and identifiers D2 collected by the asset information collection apparatus 10 according to the present embodiment. In the present example, the identifiers D2 corresponding to two users, and a plurality of items of anonymous asset information D1 associated with the identifiers D2, respectively, are illustrated by way of example.

The identifiers D2 in the present example include an identifier "abcd" corresponding to a first user and an identifier "wxyz" corresponding to a second user. An identifier is not necessarily configured of letters, and may include numbers or any characters.

The anonymous asset information D1 in the present example includes type of business D1a, finance institution name D1b in which asset information is collected, individual score D1c calculated per type of assets, total score D1d as a total of scores calculated per type of assets, and reliability D1e. Type of business D1a is the type of a finance institution in which asset information is collected, and in the present example, it can be confirmed that asset information of the first user corresponding to the identifier "abcd" is collected for one "bank" and two "securities firms." Further, it can be confirmed that asset information of the second user corresponding to the identifier "wxyz" is collected for one "securities firm."

Finance institute name D1b is the name of a finance institution in which asset information is collected. In the present example, asset information collected from the bank B's server 20*b* is indicated as "bank B," asset information collected from the securities firm A's server 20*a* is indicated as "securities firm A," and asset information collected from the securities firm C's server 30*a* is indicated as "securities firm C." Finance institute name D1*b* may not necessarily be included in the anonymous asset information D1, but finance institution name D1*b* is included in the anonymous asset information D1 thereby to compare how much assets is managed by which finance institution.

Individual score D1*c* is a score calculated per type of assets. In the present example, individual score D1*c* is calculated per asset information collected from a different finance institution, and the first user has an individual score of "10" for type of business "bank" and finance institution name "bank B," an individual score of "5" for type of business "Securities" and finance institution name "securities firm A," and an individual score of "1" for type of business "securities" and finance institution name "securities firm C." The second user has an individual score of "6" for type of business "securities" and finance institution name "securities firm C." Individual score D1*c* may include a score calculated for insurances, real estates, debts, and the like.

Individual score D1*c* is collected in this way thereby to grasp how much assets of what kind one or more users hold, thereby comparing the asset situations per type of assets.

Total score D1*d* is a total of individual scores D1*c*, and may be calculated by an average value of the individual scores D1*c* or may be calculated by a weighted average value of the individual scores D1*c*, for example. In the present example, the first user has a total score of "5" and the second user has a total score of "7."

Total score D1*d* is calculated in this way thereby to grasp how much total asset one or more users hold, thereby comparing the total asset situations. When the anonymous asset information D1 is provided to a third party, individual score D1*c* is not provided but total score D1*d* is provided so that it is difficult to identify an individual, thereby reducing a sense of resistance of the individual against the provision.

Reliability D1*e* indicates a value which is an evaluated reliability of a total score depending on the number of individual scores used for calculating total score D1*d*. Reliability D1*e* may be calculated such that a higher value is indicated for the larger number of individual scores used for calculating total score D1*d*. Herein, the number of individual scores does not indicate the values of the individual scores but indicates the number of items of data of the individual scores stored in a discriminable manner. In the present example, the total score of the first user is calculated by use of three individual scores, and is evaluated as appropriately reflecting the situation of total assets held by the first user, and thus reliability indicates a high reliability of "A." On the other hand, the total score of the second user is calculated by use of a single individual score, and is evaluated as not appropriately reflecting the situation of total assets held by the second user, and thus reliability indicates a low reliability of "C." Reliability may be a graduated evaluation value by three degrees or the like, or may be a continuous evaluation value. Reliability D1*e* may include an evaluated value of reliability of a total score when asset information is acquired. For example, reliability of a total score may be evaluated as higher as asset information is acquired more recently.

Reliability D1*e* is indicated to confirm whether anonymous asset information on total assets correctly reflects a total asset situation of a user, thereby more accurately comparing the total asset situations.

Figure 5:
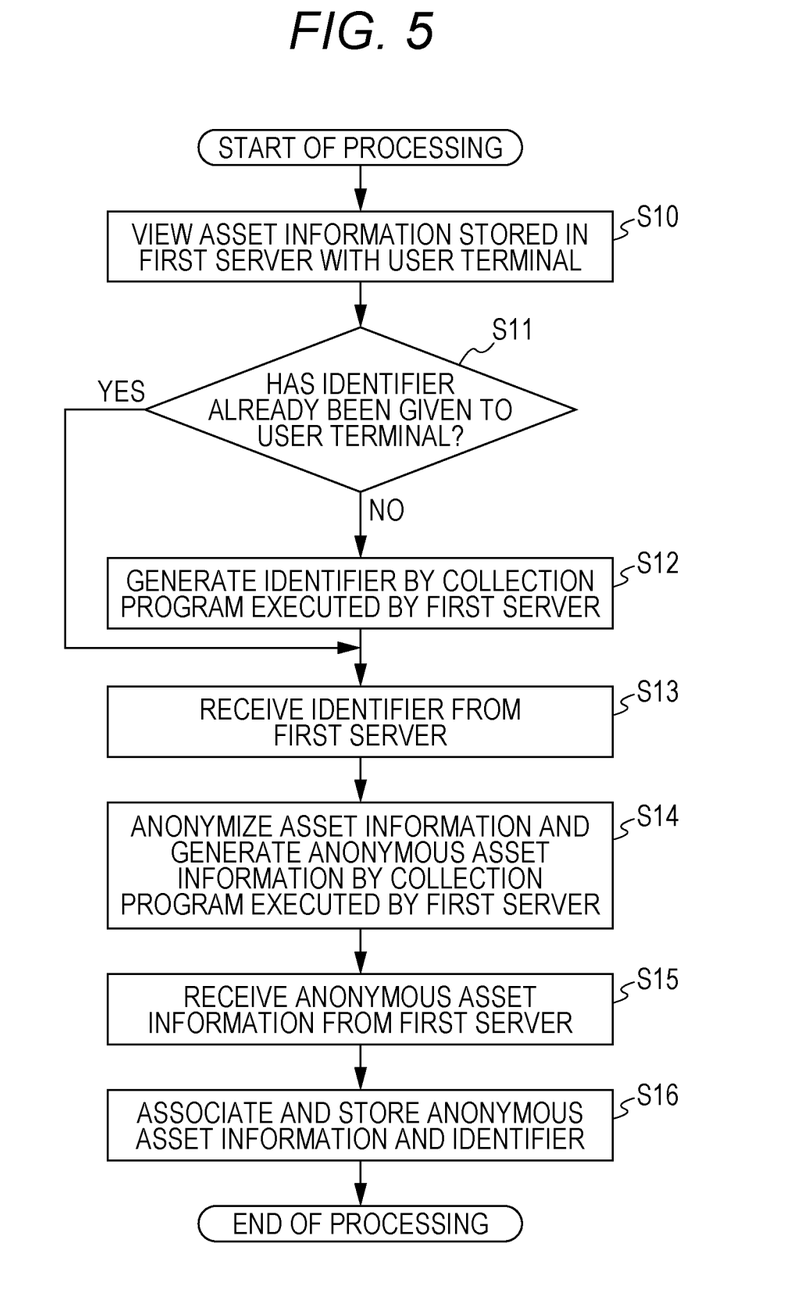
FIG. 5 is a flowchart of first processing performed by the asset information collection apparatus according to the present embodiment.

FIG. 5 is a flowchart of first processing performed by the asset information collection apparatus 10 according to the present embodiment. The first processing is processing of generating an identifier by the first server 20 and collecting anonymous asset information and the identifier from the first server 20.

When the asset information stored in the first server 20 is viewed by the user terminal 40 (S10), the collection program D3 is called by the tag of the collection program D3 embedded in the web page of the first server 20, and a determination is made as to whether an identifier has already been given to the user terminal 40 (S11). When an identifier has not been given to the user terminal 40 (S11: NO), an identifier corresponding to the user of the user terminal 40 is generated by the collection program D3 called by the tag embedded in the web page of the first server 20 (S12). On the other hand, when an identifier has already been given to the user terminal 40, the already-given identifier is specified.

Thereafter, the asset information collection apparatus 10 receives the identifier generated or specified by the first server 20 from the first server 20 (S13). The collection program D3 called by the tag embedded in the web page of the first server 20 anonymizes the asset information viewed by the user terminal 40 and generates anonymous asset information (S14). The asset information collection apparatus 10 then receives the anonymous asset information generated by the first server 20 from the first server 20 (S15).

Finally, the asset information collection apparatus 10 associates the anonymous asset information and the identifier received from the first server 20, and stores them in the storage part 13 (S16). The first processing thus ends.

Figure 6:
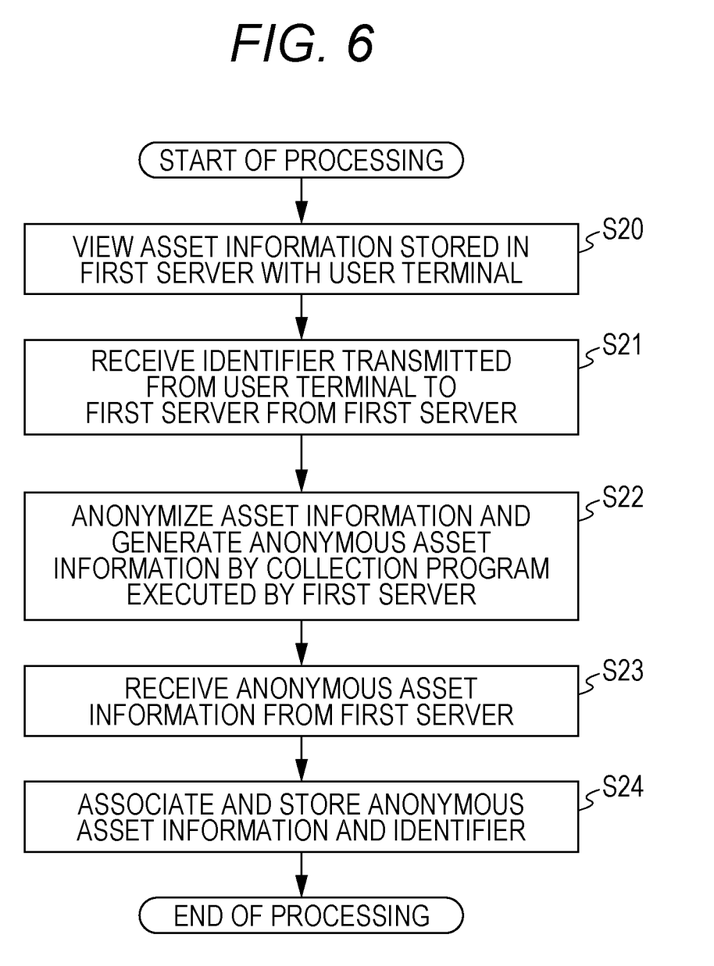
FIG. 6 is a flowchart of second processing performed by the asset information collection apparatus according to the present embodiment.

FIG. 6 is a flowchart of second processing performed by the asset information collection apparatus 10 according to the present embodiment. The second processing is processing of collecting an identifier prepared by the user terminal 40 and anonymous asset information generated by the first server 20 from the first server 20.

When the asset information stored in the first server 20 is viewed by the user terminal 40 (S20), the asset information collection apparatus 10 receives the identifier transmitted from the user terminal 40 to the first server 20 from the first server 20 (S21).

The collection program D3 called by the tag embedded in the web page of the first server 20 anonymizes the asset information viewed by the user terminal 40, and generates anonymous asset information (S22). The asset information collection apparatus 10 then receives the anonymous asset information generated by the first server 20 from the first server 20 (S23).

Finally, the asset information collection apparatus 10 associates the anonymous asset information and the identifier received from the first server 20, and stores them in the storage part 13 (S24). The second processing thus ends.

Figure 7:
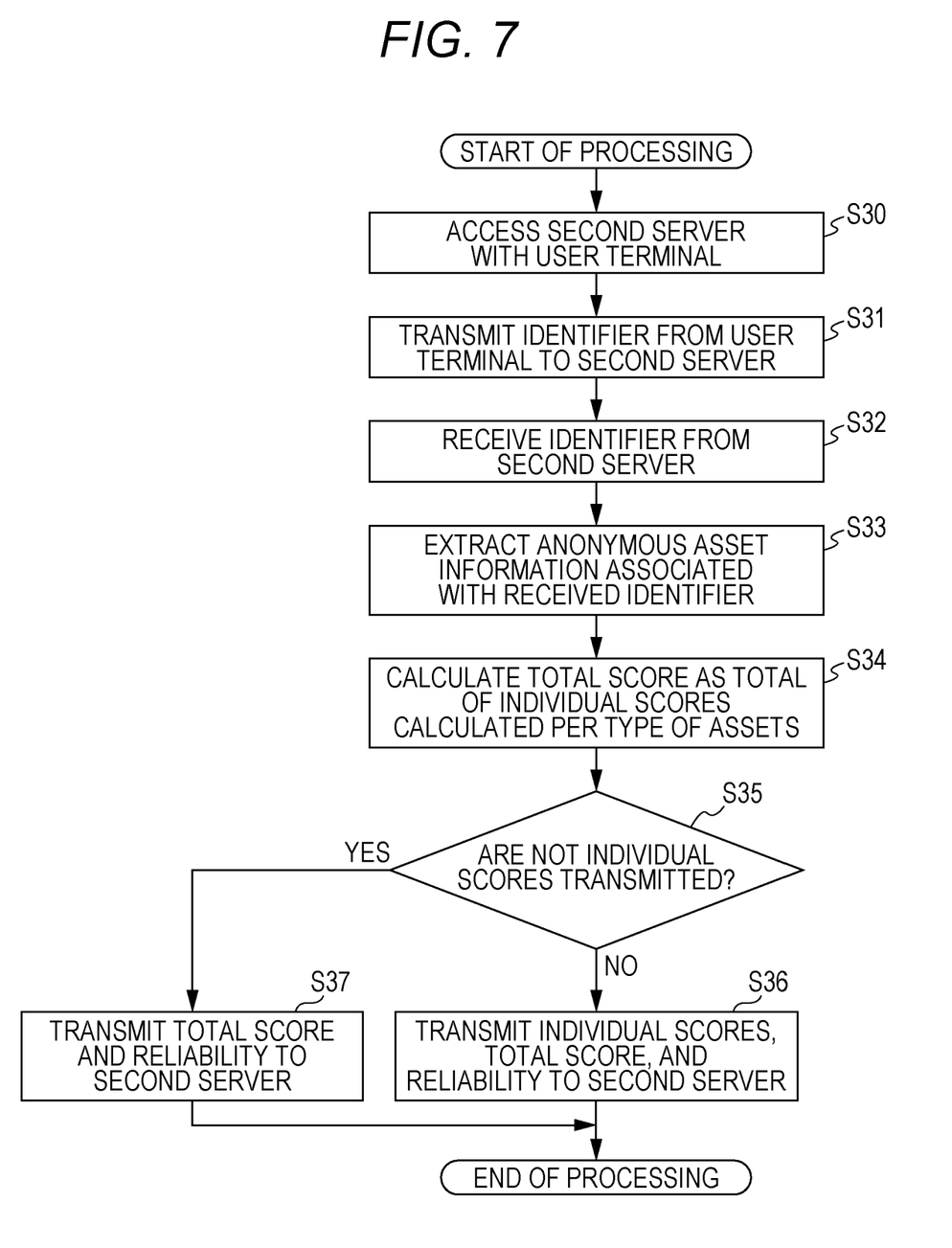
FIG. 7 is a flowchart of third processing performed by the asset information collection apparatus according to the present embodiment.

FIG. 7 is a flowchart of third processing performed by the asset information collection apparatus 10 according to the present embodiment. The third processing is processing of providing anonymous asset information to the second server 30 which provides a user with various services.

When the user terminal 40 accesses the second server 30 (S30) and an identifier is transmitted from the user terminal 40 to the second server 30 (S31), the asset information collection apparatus 10 receives the identifier transmitted from the user terminal 40 to the second server 30 from the second server 30 (S32).

The asset information collection apparatus 10 extracts the anonymous asset information associated with the received identifier (S33). In the present example, it is assumed that an individual score calculated per type of assets is included in the anonymous asset information. The asset information collection apparatus 10 calculates a total score as a total of individual scores calculated per type of assets (S34). The total score may be previously calculated and stored in the storage part 13.

The asset information collection apparatus 10 determines whether to transmit the individual scores to the second server 30 (S35). Whether to transmit the individual scores may be determined depending on the form of a service provided by the second server 30, may be determined according to a predetermined rule, or may be determined on the basis of request contents from the second server 30. When it is not determined that the individual scores are not transmitted (S35: NO), or when transmitting the individual scores, the asset information collection apparatus 10 transmits the individual scores, the total score, and the reliability to the second server 30 (S36). On the other hand, when not transmitting the individual scores (S35: YES), the asset information collection apparatus 10 transmits the total score and the reliability to the second server 30 (S37). The third processing thus ends.

The aforementioned embodiment is directed to facilitating understanding of the present invention, and does not intend to interpret the present invention in a limited manner. The respective components provided in the embodiment as well as their arrangement, materials, conditions, shapes, and sizes are not limited to the illustrated ones, and can be modified as needed. The components illustrated in the embodiment can be partially replaced or combined.

What is claimed is:

1. A method for anonymizing data in a system including an asset information collection apparatus, a user terminal, a first server, and a second server, the method comprising:
   storing, by the first server, a program;
   displaying asset information on a webpage generated by the first server, the web page including a tag;
   making, by the first server, a determination that the webpage is viewed by the user terminal;
   calling, by the first server, based on making the determination, the program based on the tag;
   anonymizing, by the program called by the first server, the asset information into anonymized asset information;
   generating, by the program called by the first server, a first identifier for a user of the user terminal;
   transmitting, by the first server, the anonymized asset information and the first identifier to the asset information collection apparatus;
   associating and storing, by the asset information collection apparatus, the anonymized asset information and the first identifier in a database;
   receiving, by the second server, a second identifier from the user terminal, the second identifier having a value equal to the first identifier;
   transmitting, by the second server, the second identifier to the asset information collection apparatus;
   locating, by the asset information collection apparatus, the anonymized asset information based on the second identifier; and
   transmitting, by the asset information collection apparatus, the anonymized asset information to the second server.

2. The method according to claim 1, wherein the asset information collection apparatus sends the program to the first server.

3. The method according to claim 1, wherein the first and second identifiers are generated from an Internet Protocol address of the user terminal.

4. A computer system, comprising:
   a communication network;
   user terminals, coupled to the communication network;
   first servers, configured to
      store, in the storage part, a program and an HTML file having an embedded tag,
      call, when the HTML file is viewed at one of the user terminals, the program based on the tag;
      output, by the program, an information identifier associated with the one of the user terminals,
      anonymize items of personal information, corresponding to a user of the one of the user terminals, into items of anonymous information, and
      output the items of anonymous information;
   second servers, configured to
      provide services to the users in response to receipt of a request identifier from the one of the user terminals, and
      output the request identifier; and
   an information collection apparatus, configured to
      receive and store the information identifier associated with the first items of anonymous information from the first servers,
      receive the request identifier from one of the second servers
      locate at least one item of anonymous information associated with the information identifier that matches the request identifier, and
      send the at least one item of the anonymous information to the one of the second servers in response to receipt of the request identifier,
   wherein each of the first and second servers and the information collection apparatus are coupled via the communication network.

5. The computer system according to claim 4, wherein the items of the anonymous asset information include the total scores calculated per type of the assets, respectively.

6. The computer system according to claim 4, wherein the anonymous asset information includes total scores, each total score corresponding to a type of assets.

7. The computer system according to claim 6, wherein the reliabilities of the total scores is a graduated evaluation value by degrees.

8. The computer system according to claim 6, wherein the reliabilities of the total scores also depend upon when each of the individual scores was obtained.

* * * * *